A. M. LAYCOCK.
BALL BEARING.
APPLICATION FILED MAR. 7, 1914.

1,231,752.

Patented July 3, 1917.

WITNESSES

INVENTOR
Arthur M. Laycock
BY
Raymond Hacker.
ATTORNEY

UNITED STATES PATENT OFFICE.

ARTHUR M. LAYCOCK, OF WILKES-BARRE, PENNSYLVANIA.

BALL-BEARING.

1,231,752.

Specification of Letters Patent.

Patented July 3, 1917.

Application filed March 7, 1914. Serial No. 823,063.

*To all whom it may concern:*

Be it known that I, ARTHUR M. LAYCOCK, a subject of the King of Great Britain, residing at Wilkes-Barre, county of Luzerne, State of Pennsylvania, have invented a certain new and useful Improvement in Ball-Bearings, and declare the following to be a full, clear, and exact description of the same, such as will enable others skilled in the art to which it pertains to make and use the same, reference being had to the accompanying drawings, which form a part of this specification.

My invention relates to roller bearings and has for its object to produce a roller bearing that shall be durable and that shall obviate the injury to the surface called the Brinnell effect.

Figure 1:
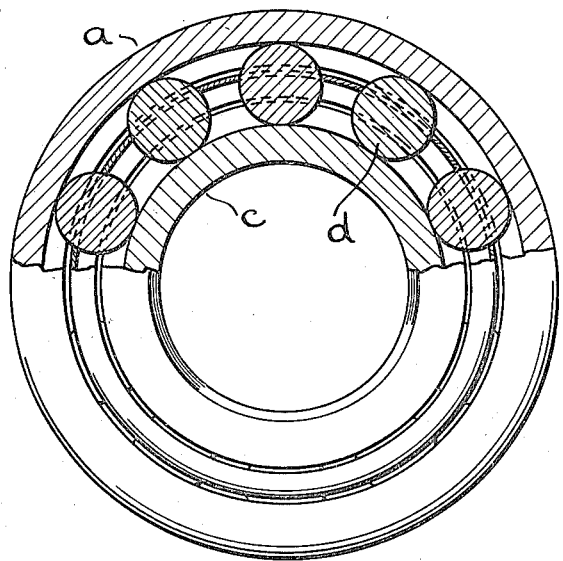

I accomplish this object in the device illustrated in the accompanying drawings in which, Figure 1 is a side view of a bearing embodying my invention having the upper part cut away to show the interior construction.

Figure 2:
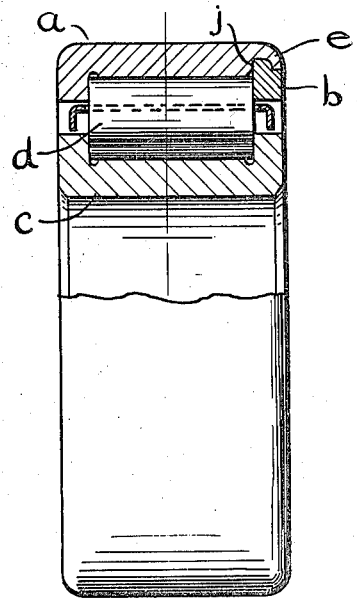

Fig. 2 is an end view of the same.

*a* is the outer race-ring, or cup, and *c* is the inner race-ring, or cone. *d* indicates the rollers interposed between the race rings. *b* is a separate ring secured so as to act as a retaining ring for the rollers. *e* is an annular flange, or lip, extending from the cup *a* laterally and being bent down as shown to secure the ring *b* in position. The ring *b* lies against a shoulder *j* formed in the race-ring. The ends *f f* of the rollers *d* are formed in planes at right angles to the axis of said rollers. The inner surface of the ring *b* is in the same plane as the contiguous ends of the rollers *d* and there are formed on the race rings *a* and *c* annular shoulders *g*, *h* and *i* in planes at right angles to the axis of the rollers. The plane surfaced ends of the rollers lie against the shoulders *g*, *h*, *i* and the inner surface *k* of the ring *b*.

In the above construction the end thrusts are taken upon plane surfaces having a considerable area of contact so that the contiguous surfaces are not indented and injured by the shocks incident to their use.

The opposite faces or race-surfaces with which the rollers engage are accessible to a gage so that their distance apart may be accurately measured and the rollers may be placed very closely adjacent to each other so that the space is practically filled and the end surfaces together form a large bearing surface to resist end thrusts.

What I claim is:

1. As an article of manufacture, a race ring for a roller bearing, said ring formed with a shoulder at one end thereof, an integral bendable lip at the other end and having an intermediate cylindrical surface for the rollers.

2. A roller bearing comprising an inner ring having a shoulder at each end, an outer ring having a shoulder at one end and an integral bendable lip at the other end, a retaining ring held in position by said lip and rollers interposed between said rings.

3. A roller bearing comprising an inner and an outer race ring, shoulders formed at the ends of one of the rings, the other ring having a shoulder at one end and an integral bendable lip at the other end, a retaining ring, said lip adapted to be bent over said retaining ring to hold it in position to form a shoulder corresponding to the other shoulder at the opposite end of the race ring.

4. A roller bearing comprising an inner race ring, an outer race ring, cylindrical rollers interposed between said rings, means for holding said rollers against longitudinal displacement relative to said rings including a retaining ring engaging one end of each of said rollers and held in place by an integral bent over lip on one of said race rings.

In testimony whereof, I sign this specification in the presence of two witnesses.

ARTHUR M. LAYCOCK.

Witnesses:
JOHN J. JENNINGS,
WILLIAM H. POAD.